(12) United States Patent
Fisher et al.

(10) Patent No.: US 6,336,777 B1
(45) Date of Patent: Jan. 8, 2002

(54) FACE HOBBING OF HYPOID GEARS USING A TWO-SPINDLE MACHINE

(75) Inventors: James Steven Fisher, Huntertown; Roland Clark Smith, Milford; John Edward Masseth, Fort Wayne, all of IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 0 days.

(21) Appl. No.: 09/576,227

(22) Filed: May 22, 2000

(51) Int. Cl.[7] .................................................. B23F 9/10
(52) U.S. Cl. ............................. 409/26; 409/27; 409/40; 409/55
(58) Field of Search .............................. 409/25, 26, 39, 409/40, 51, 55, 27, 28

(56) References Cited

U.S. PATENT DOCUMENTS

| | | | |
|---|---|---|---|
| 563,301 A | * 7/1896 | O'Connor | 409/55 |
| 638,563 A | * 12/1899 | Cuntz | 409/40 |
| 1,233,180 A | 7/1917 | Burgess | |
| 1,268,512 A | 6/1918 | Sundstrand | |
| 1,732,700 A | 10/1929 | Sommer et al. | |
| 1,940,703 A | * 12/1933 | Stewart | 409/55 |
| 2,049,492 A | 8/1936 | Drader et al. | |
| 2,567,273 A | 9/1951 | Carlsen | |
| 2,869,427 A | 1/1959 | Carlsen et al. | |
| 3,022,569 A | * 2/1962 | Wildhaber | 409/55 |
| 3,285,134 A | * 11/1966 | Kehr | 409/55 |
| 5,895,180 A | * 4/1999 | Stadtfeld | 409/26 |

* cited by examiner

*Primary Examiner*—Daniel W. Howell
(74) *Attorney, Agent, or Firm*—Liniak, Berenato, Longacre & White

(57) ABSTRACT

This invention is directed to a method of using a two spindle Hurth-Module multi-spindle (or similar) cutting machine to accomplish face hobbing of hypoid and spiral bevel gear sets. A first cutter mounted on a first spindle would rough cut the gears and a second cutter mounted on a second spindle would finish the gears with both cutters using a face hobbing process. According to this process, multiple cutters are used for a single gear, but on a single machine, thereby reducing cutter wear, increasing cutter life, and raising production output of the multi-spindle machine by utilizing both spindles. In one embodiment, a fine pitch cutter is used to create the initial rough-cut of the gear, and a second coarse pitch cutter is used to create the finish cut of the gear.

18 Claims, 3 Drawing Sheets

FACE HOBBING OF HYPOID GEARS USING A TWO-SPINDLE MACHINE

BACKGROUND OF THE INVENTION

1) Field of the Invention

The invention generally relates to the field of manufacturing gears of the hypoid gear type. More specifically, the invention relates to the use of a two spindle Hurth-Module multi-spindle cutting machine to perform face hobbing of hypoid and spiral bevel pinion and ring gears utilizing a process which employs both spindles of the machine to successively rough and finish hypoid gears using a face hobbing method.

2) Description of the Related Art

The field of gear cutting offers various alternative processes to be used in manufacturing a bevel gear. Depending on the type of gear, i.e., spiral bevel, hypoid, etc., various machines and methods are available to cast, forge or machine the gear tooth shape. For hypoid and spiral bevel gears, particularly, the process usually chosen comprises either face milling or face hobbing of the gears. In face milling, a rotating cutter, having cutter blades mounted along a selected radius, is fed into a selected tooth slot on a workpiece (gear blank) whereupon all of the blades on the cutter successively pass through the tooth slot at a selected depth and cut and shape the tooth in a single plunge cycle of the cutter. The gear (workpiece) is then indexed to the next tooth position and the cutter is again fed into the workpiece and a tooth slot is formed. In addition, the face milling process can require several cuts, rough and finish, to create a given gear set. For a combination pinion and ring gear (for a hypoid gear set) five cuts into the gear pairs are usually required; three cuts for the pinion (one rough-cut, followed by two finish cuts) and two cuts for the ring gear (one rough, one finish). These successive milling operations require several mounts and dismounts of the workpiece between cutting machines and involve several different machines and a plurality of rotating cutters.

An alternative to face milling is the process of face hobbing. In the face hobbing process, a rotary cutter having a plurality of cutters mounted at a selected radius and depth, but not in line, rather in groups or pairs, are again fed into a workpiece. In this process, however, instead of the workpiece remaining relatively fixed as each successive gear tooth is formed, the workpiece gear indexes in a rotary manner so that each successive group of cutter blades passes through successive tooth slots of the tooth being formed in a timed relationship. In addition, in the face hobbing process, the cutter positioning machine axes may sometimes move slowly and slightly as the gear is being engaged by the cutter groups to help generate the tooth form. Once all of the teeth on the gear have been sufficiently cut, the process stops and the gear is finished for that machining operation. In this process, conventionally, either a machine with one cutter spindle is used or one cutter spindle of a Hurth-Module multi-spindle machine has been employed, with a single cutter, i.e., with the cutter geometry designed for a smooth gear tooth finish, mounted thereon. Owing to the single cutter being used repeatedly, the rate of cutter wear is high and, where the process using only a single spindle of the multi-spindle machine, efficient use of the machine is diminished.

SUMMARY OF THE INVENTION

This invention is directed to a method of using both cutting spindles of a two spindle Hurth-Module multi-spindle cutting machine to accomplish face hobbing of hypoid gear sets. A first hobbing type cutter, mounted on a first one of the two spindles, face hobs and rough cuts the gear (workpiece) and a second hobbing type cutter mounted on the second spindle finish cuts the gear (workpiece) using face hobbing. In one embodiment of the invention, a fine pitch cutter on a first spindle is used to rough cut the gears and a second coarse pitch cutter, mounted on a second spindle, is used to finish cut the gears. According to this process, multiple cutters are used for a single gear, but on a single machine, thereby reducing cutter wear, increasing cutter life, and raising production output of the multi-spindle machine by utilizing both spindles.

DETAILED DESCRIPTION OF THE PREFERRED EMBODIMENT

Figure 1:
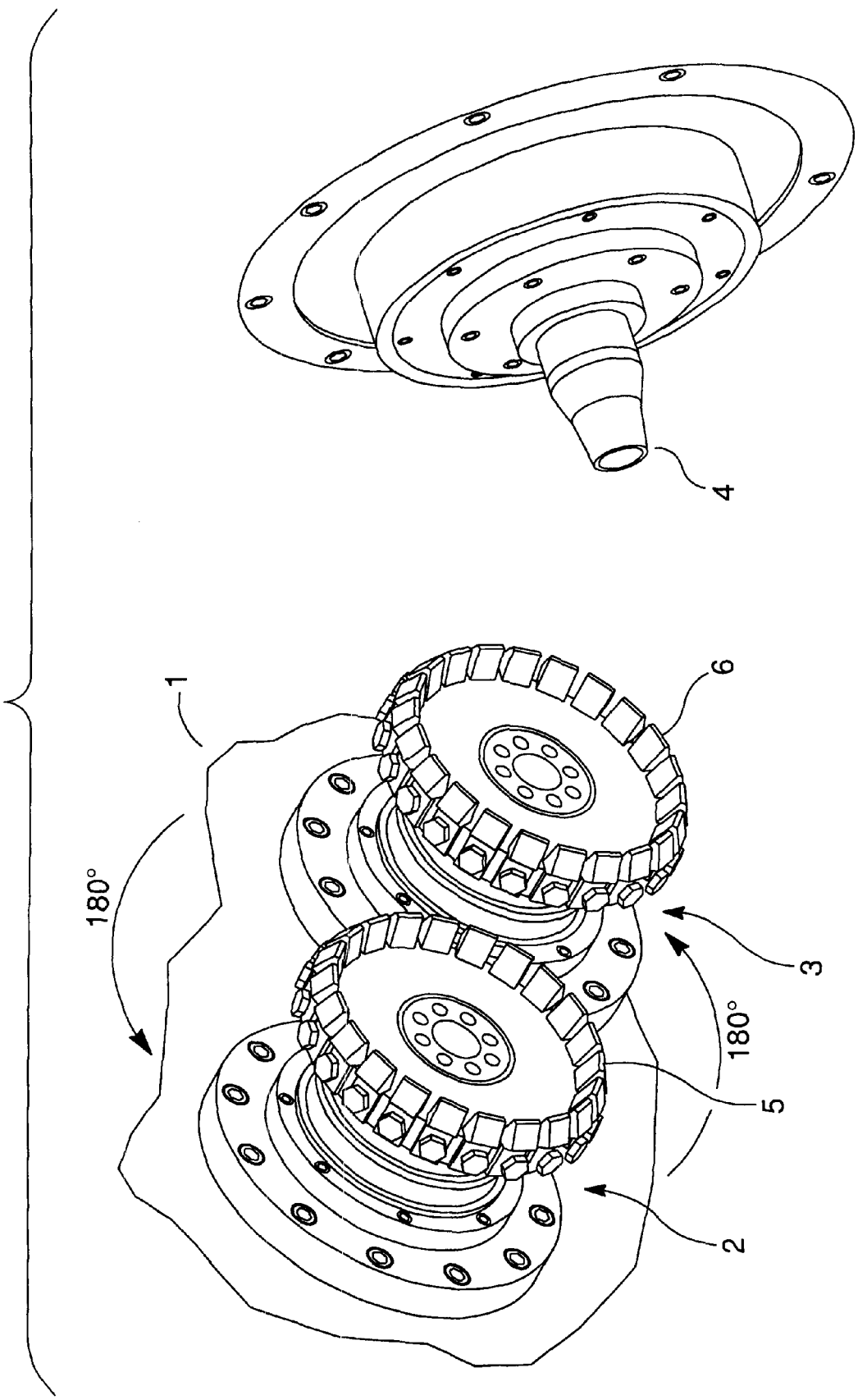
FIG. 1 is a perspective view of a Hurth-Module multi-spindle machine used in the present process.
Figure 2:
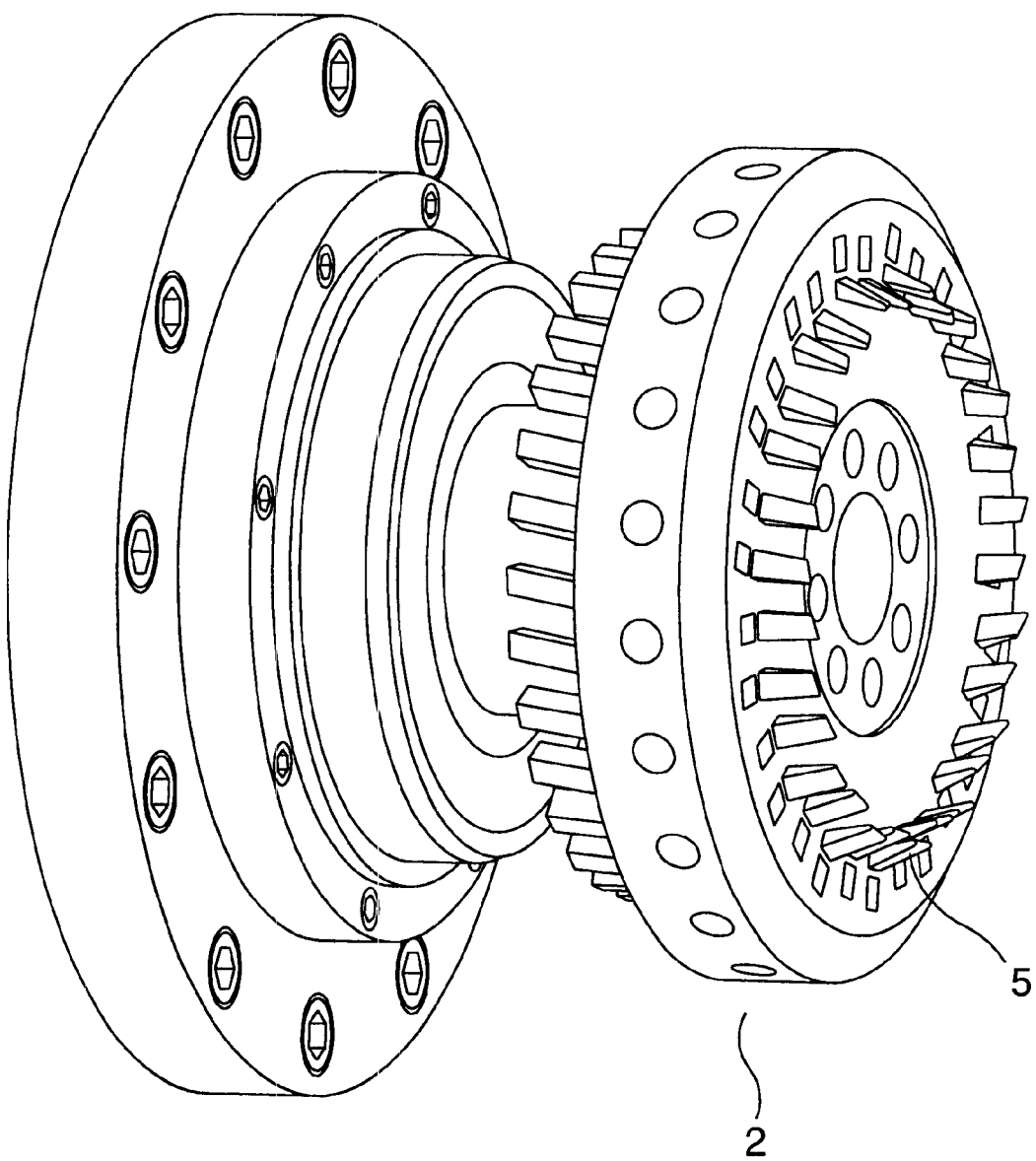
FIG. 2 is a perspective view showing a single rotary cutter disc of a Hurth-Module used in the present process.
Figure 3:
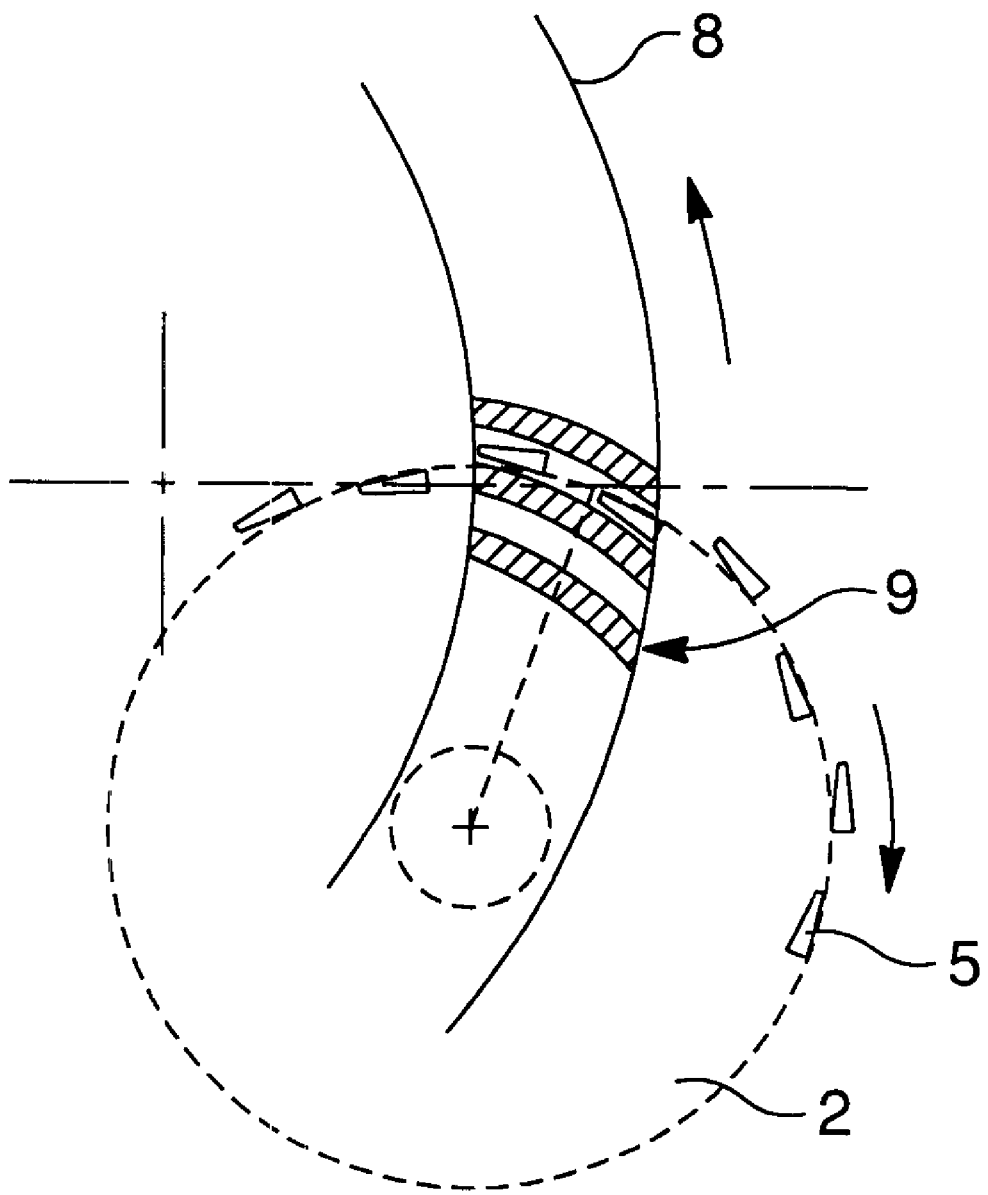
FIG. 3 shows a ring gear form as it is face hobbed according to the present method.

FIG. 1 shows a perspective view of a Hurth-Module multi-spindle machine 1 used in the present process. FIG. 2 shows a single spindle 2 of the Hurth-Module multi-spindle machine shown in FIG. 1. FIG. 3 shows the face hobbing process and the relative interaction of a gear (workpiece) 8, in this case a ring gear, as the gear teeth 9 are successively cut by blade groups of spindle 2 mounted cutters 5. The gear and the spindle each rotate in the direction of the arrows indicated.

In the process, each spindle 2, 3 is separately programmed to face hob a gear 8 mounted to the workpiece holder 4. The first spindle 2 is programmed according to the rough-cut cutters 5 mounted thereon. Once the rough cut is finished on the gear (workpiece) 8 mounted to the holder 4, the first cutter 5 is withdrawn from the workpiece, the entire pair of first 2 and second 3 spindles and associated cutters 5, 6 indexes 180 degrees, and the second cutter 6 then engages the workpiece and finish cuts the gear which remains mounted to the workpiece holder 4.

In a preferred embodiment of the process, a fine pitch cutter is used on the first spindle 2, to create the rough cut of the gear teeth, and a coarse pitch finish cutter is utilized on the second spindle 3 to create the finish cut on the gear teeth. The cutter blades on either the rougher or the finisher can comprise high-speed steel cutter blades, carbide, or other materials. That is, a high-speed steel rougher can be used in combination with a carbide finisher or vice-versa. Gleason is one of several manufacturers that make both types of cutters to fit the Hurth-Module machine 1. Since more than one cutter is successively forming the tooth channel, the first cutter (rougher) and second cutter (finisher) can have optimized rake and relief geometry to maximize cutter life with respect to their respective tasks in forming the gear tooth. That is, the rough cutter can leave the teeth in a relatively less smooth condition and the finish cutter, only, can take up the task of smooth finishing the teeth as a part of the finish cutting process.

The forgoing description of the invention is related in the context of using a Hurth-Module multi-spindle-cutting machine. However, it will be evident to one of ordinary skill in the gear manufacturing art that other multi-spindle gear cutting machines capable of face hobbing bevel gears can also be used.

We claim:

1. A method of cutting hypoid gear teeth, comprising:

mounting a gear to be cut to a workpiece holder of a multi-spindle rotary cutting machine;

rough cutting a set of hypoid gear teeth into said workpiece using a first rotary cutter of said multi-spindle cutting machine using a face hobbing cutting method where groups of cutters mounted on said rotary cutter pass through successively indexed teeth being formed on said workpiece;

indexing said multi-spindle cutting machine to orient a second rotary cutter to face hob said workpiece;

finish cutting said set of hypoid gear teeth into said workpiece using said second rotary cutter in a face hobbing method; and, dismounting said gear from said workpiece holder.

2. A method as in claim 1, wherein:

said first rotary cutter has a fine pitch cutter mounted thereon for said rough cut.

3. A method as in claim 1, wherein:

said first rotary cutter has a coarse pitch cutter mounted thereon for said rough cut.

4. A method as in claim 1, wherein:

said second rotary cutter has a coarse pitch cutter mounted thereon for said finish cut.

5. A method as in claim 2, wherein:

said second rotary cutter has a coarse pitch cutter mounted thereon for said finish cut.

6. A method as in claim 3, wherein:

said second rotary cutter has a coarse pitch cutter mounted thereon for said finish cut.

7. A method as in claim 1, wherein:

said second rotary cutter has a fine pitch cutter mounted thereon for said finish cut.

8. A method as in claim 2, wherein:

said second rotary cutter has a fine pitch cutter mounted thereon for said finish cut.

9. A method as in claim 3, wherein:

said second rotary cutter has a fine pitch cutter mounted thereon for said finish cut.

10. A method of cutting spiral bevel gear teeth, comprising:

mounting a gear to be cut to a workpiece holder of a multi-spindle rotary cutting machine;

rough cutting a set of spiral bevel gear teeth into said workpiece using a first rotary cutter of said multi-spindle cutting machine using a face hobbing cutting method where groups of cutters mounted on said rotary cutter pass through successively indexed teeth being formed on said workpiece;

indexing said multi-spindle cutting machine to orient a second rotary cutter to face hob said workpiece;

finish cutting said set of spiral bevel gear teeth into said workpiece using said second rotary cutter in a face hobbing method; and, dismounting said gear from said workpiece holder.

11. A method as in claim 10, wherein:

said first rotary cutter has a fine pitch cutter mounted thereon for said rough cut.

12. A method as in claim 10, wherein:

said first rotary cutter has a coarse pitch cutter mounted thereon for said rough cut.

13. A method as in claim 10, wherein:

said second rotary cutter has a coarse pitch cutter mounted thereon for said finish cut.

14. A method as in claim 11, wherein:

said second rotary cutter has a coarse pitch cutter mounted thereon for said finish cut.

15. A method as in claim 12, wherein:

said second rotary cutter has a coarse pitch cutter mounted thereon for said finish cut.

16. A method as in claim 10, wherein:

said second rotary cutter has a fine pitch cutter mounted thereon for said finish cut.

17. A method as in claim 11, wherein:

said second rotary cutter has a fine pitch cutter mounted thereon for said finish cut.

18. A method as in claim 12, wherein:

said second rotary cutter has a fine pitch cutter mounted thereon for said finish cut.

* * * * *